United States Patent [19]

Onda et al.

[11] E Patent Number: Re. 33,117

[45] Reissued Date of Patent: Nov. 21, 1989

[54] FOCAL PLANE SHUTTER FOR CAMERAS

[75] Inventors: Eiichi Onda, Yamanashi; Masanori Watanabe, Narashino, both of Japan

[73] Assignee: Seiko Koki Kabushiki Kaisha, Tokyo, Japan

[21] Appl. No.: 679,036

[22] Filed: Dec. 6, 1984

Related U.S. Patent Documents

Reissue of: 4096505

[64] Patent No.: ~~0,965,05~~
Issued: Jun. 20, 1978
Appl. No.: 713,591
Filed: Aug. 11, 1976

U.S. Applications:

[63] Continuation-in-part of Ser. No. 686,501, May 14, 1976, abandoned.

[51] Int. Cl.[4] ..... G03B 9/36

[52] U.S. Cl. ..... 354/246; 354/249; 354/250

[58] Field of Search ..... 354/241, 242, 245, 246, 354/247, 248, 249, 250, 251, 253, 254, 255, 261, 264, 265

[56] References Cited

U.S. PATENT DOCUMENTS

| | | | |
|---|---|---|---|
| 3,628,434 | 12/1971 | Leitz | 354/249 |
| 3,810,223 | 5/1974 | Kitai et al. | 354/250 |
| 3,825,940 | 7/1974 | Hayami | 354/251 |
| 3,829,878 | 8/1974 | Onda et al. | 354/246 |
| 3,903,538 | 9/1975 | Yoshizaki | 354/251 |
| 3,946,413 | 3/1976 | Onda et al. | 354/251 |
| 3,999,196 | 12/1976 | Inoue | 354/246 |
| 4,150,890 | 4/1979 | Nakagawa et al. | 354/246 |
| 4,264,177 | 4/1981 | Kitai et al. | 354/246 |

*Primary Examiner*—A. A. Mathews
*Attorney, Agent, or Firm*—Bruce L. Adams; Van C. Wilks

[57] ABSTRACT

A camera shutter mechanism for opening and closing a shutter aperture to effect an exposure comprises a group of opening blades movable, when released, from a closed position covering the shutter aperture to an open position uncovering the shutter aperture to thereby initiate an exposure, and a group of closing blades movable, when released, from an open position uncovering the shutter aperture to a closed position covering the shutter aperture to thereby terminate the exposure. A release mechanism releases the opening blades thereby enabling them to move to the open position for initiating the exposure, and subsequently releases the closing blades thereby enabling them to move to the closed position for terminating the exposure. A driving member automatically operates immediately after completion of the exposure to move the group of opening blades back towards the closed position so that the aperture is at least partially covered thereby so as to improve the light-shielding capability of the shutter mechanism.

8 Claims, 6 Drawing Sheets

FIG. 1A
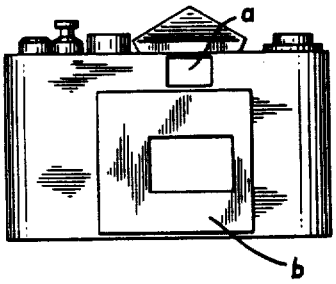
FIG. 1B
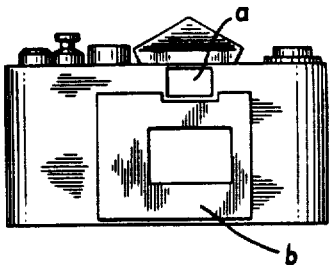
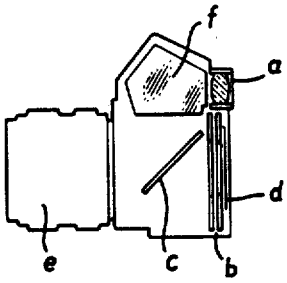
FIG. 1C
FIG. 2
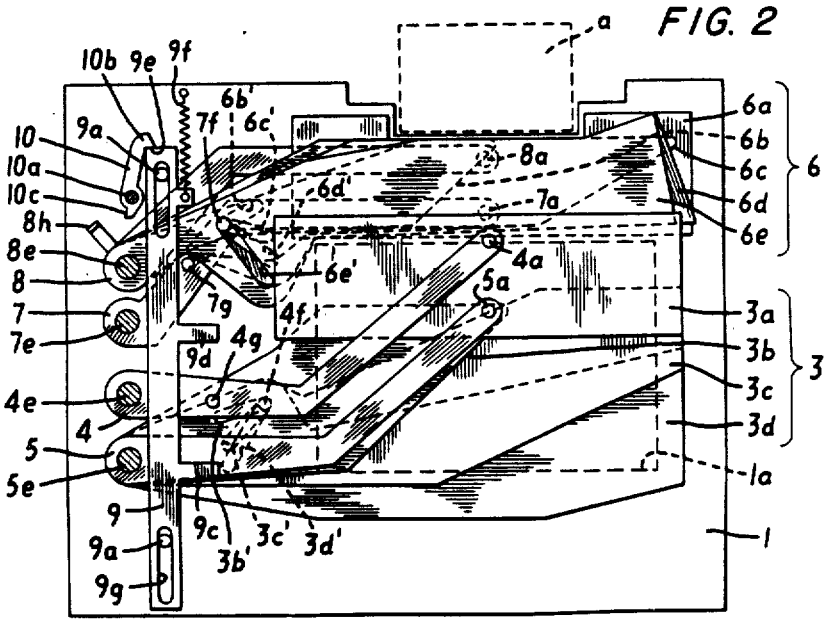

FIG. 8
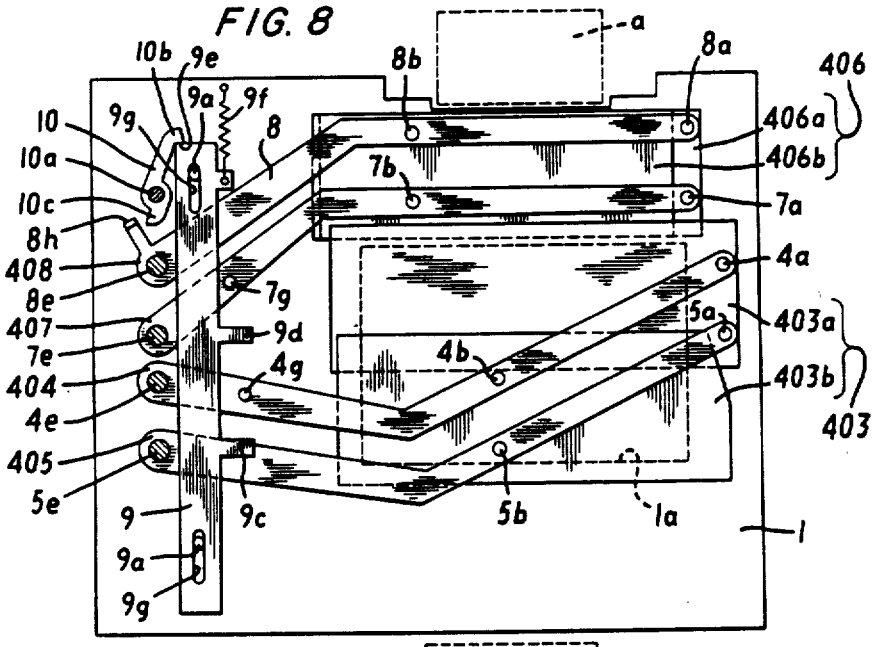
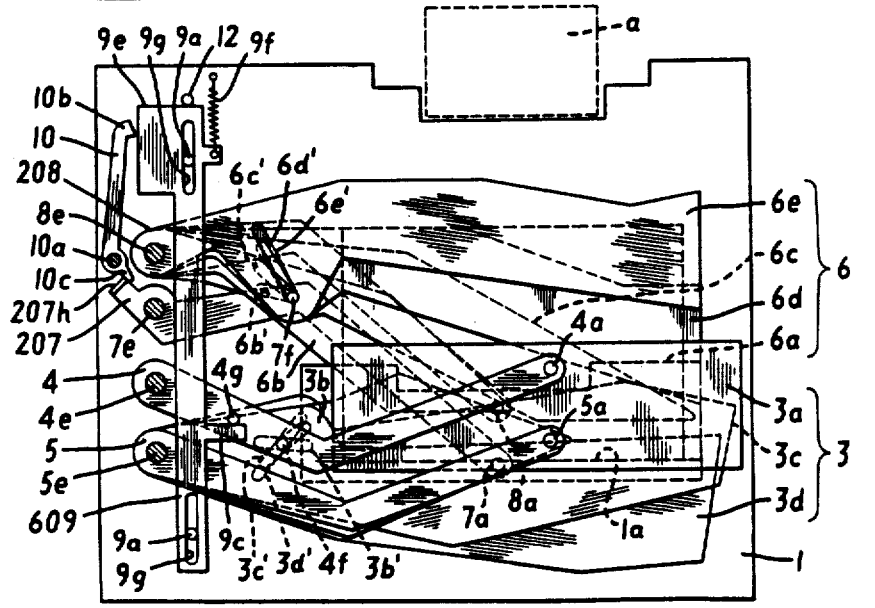
FIG. 12

FOCAL PLANE SHUTTER FOR CAMERAS

Matter enclosed in heavy brackets [ ] appears in the original patent but forms no part of this reissue specification; matter printed in italics indicates the additions made by reissue.

RELATED APPLICATION

This application is a continuation-in-part of application Ser. No. 686,501 filed May 14, 1976, now abandoned.

DETAILED DESCRIPTION OF THE INVENTION

This invention relates to a shutter blade arrangement of a focal plane shutter for cameras.

In the conventional, so-called metal focal plane shutter which opens or closes an aperture by displacing a plurality of divided shutter blades to different extents of displacement one after another, the size of such divided blades in general tends to be large because of the large area of the aperture. This in turn tends to call for a larger shutter space, which is not suitable for a compact camera. Particularly, in cases where such a metal focal plane shutter is employed in the so-called single-lens reflex camera which is arranged to observe an image through a photographing lens at a view finder disposed on top of the camera body and which has become popular in recent years, the shutter blades which are folded or retracted in the upper part of the camera during an exposure operation are positioned immediately below the finder; and this restricts the finder mounting position in the vertical direction thus presenting a problem in the reduction of the size of the camera.

Generally, the size of this type of single-lens reflex camera in the vertical direction is determined by the size of a film loading chamber or a lens barrel in the lower part while it is determined by the position of a pentagonal prism or the view finder in the upper part of the camera. The size in the lower part of the camera can be set at a relatively large value because of the relatively large space available there. As for the size in the upper part of the camera, however, it is the most difficult problem, achieving reduction in the size of the camera, to make smaller the space required for stowing the folded shutter blades between the shutter aperture and the view finder. This has indeed been the most serious drawback of the focal plane shutter of the type that moves the divided shutter blades up and down as compared with another type of focal plane shutter that operates a cloth screen arrangement in the transverse direction.

One conceivable method for solving this problem is to minimize the blade stowing space by further dividing the divided shutter blades. In accordance with such a method, however, the light shielding effectiveness of the shutter degrades as the number of such divided blade increases.

This invention, therefore, is directed to the provision of a focal plane shutter which eliminates the above mentioned drawback of the conventional shutter without lowering the light shielding ability and which is suitable for compact cameras. In accordance with this invention, a focal plane shutter of the type that accomplishes exposure by causing a plurality of divided shutter blades to run from the upper part of the camera to the lower part thereof comprises a group of opening blades which are divided blades excelling in light shielding effectiveness being prepared into a lesser number of divisions or arranged to overlap one another to an ample degree when they are in a state of covering the shutter aperture, this group of opening blades being arranged to be stowed in a space provided in the lower part of the camera; and another group consisting of closing blades which are prepared into smaller sized divisions or arranged to overlap one another to a lesser degree when they are in a state of covering the aperture, the latter group of shutter blades being arranged to be stowed in the upper part of the camera requiring only a small space there although they are inferior in light shielding effectiveness. Upon completion of an exposure, the aperture is covered by the less light effective shielding group of closing blades only for a predetermined brief period of time. Then, when the predetermined period of time has passed, the groups of the opening and closing shutter blades are displaced approximately into a charged position in such a manner that the aperture is constantly covered by the group of opening blades which excel in light shielding effectiveness. By such arrangement, the space required in the upper part of the camera for stowing the group of closing blades which are to be folded there can be made smaller without impairing the light shielding effectiveness of the shutter. Such a focal plane shutter makes possible further reduction in camera size. Furthermore, upon completion of the exposure operation, only the group of closing blades which have accomplished their work are displaced in the charging direction within a predetermined short period of time in such a manner as to additionally cover the aperture which has already been covered by the group of closing blades, so that the reduction in the space required for stowing the group of closing blades which are to be folded in the upper part of the camera can be made possible without impairing the light shielding effectiveness of the shutter.

Therefore, compared with the conventional focal plane shutter of the type arranged to accomplish exposure by running a plurality of divided shutter blades in the vertical direction, the shutter constructed in accordance with this invention makes it possible to manufacture much smaller cameras. Then, as compared with the other type of focal plane shutter which is arranged to accomplish exposure by transversely running a cloth screen, the shutter of the present invention still permits the same degree of reduction in the size of the cameras. The inventive camera shutter, therefore, has a great advantage.

Further features and advantages of the present invention will best be understood from the following detailed description when read in connection with the accompanying drawings, in which:

BRIEF DESCRIPTION OF THE DRAWING

FIG. 1 illustrates the locations of focal plane shutters, FIG. 1(A) showing the location of the conventional shutter;

FIG. 1(B) that of the invented shutter and

FIG. 1(C) being a side view of FIG. 1(B).

FIGS. 2 through 5 illustrate an embodiment of this invention with

FIG. 2 being a plan view showing the shutter in a charged state.

FIG. 3 a plan view showing the shutter in an open state;

FIG. 4 a plan view showing the shutter in a state immediately after completion of exposure and FIG. 5 another plan view showing the shutter in a state of having completed a series of actions.

FIG. 8 is a plan view of a fourth embodiment of the invention showing the shutter in a state of having been charged.

FIG. 12 is a plan view of a seventh embodiment of the invention showing it in a state or having completed a series of actions.

Referring to FIG. 1 which illustrates the location of the focal plane shutter in a single-lens reflex camera,. FIG. 1(A) represents the conventional shutter location having a view finder a disposed above the shutter b. FIG. 1(B) represents the shutter location of the present invention and FIG. 1(C) is a side view of the invented shutter. As shown in FIG. 1(C), there are provided a reflecting mirror c and a lens barrel e in front of the shutter b while there is located a film d in the rear of the shutter. Above the shutter, there are located a pentagonal prism f and a view finder a.

In FIG. 2 which illustrates the first embodiment of this invention showing the shutter in a state of having been charged, there is formed an aperture 1a in a base plate 1 for the purpose of exposing the film. In a cover plate 2 which provides a space for operating the shutter blades to open and close the aperture 1a in the film exposing operation, there is provided another aperture 2a which coincides with the other aperture 1a, the cover plate being of about the same shape as the base plate 1. The cover plate is carried by the base plate 1 in an ordinary known manner, which is not illustrated and which is omitted from description for simplification. An opening blade group 3 consists of 4 opening blades for opening the aperture 1a to effect exposure and includes an opening slit type blade 3a and shielding blades 3b, 3c and 3d. The opening slit type blade 3a is pivotally held by an opening arm 4 and an auxiliary opening arm 5 at shifts 4a and 5a on their reverse sides in such a manner as to make a parallel movement utilizing the nature of a parallelogram, the arms 4 and 5 being rotatably held at shafts 4e and 5e on the base plate 1 respectively. The shielding blades 3b and 3c and 3d are held to be rotatably coaxially with the shaft 5a of the auxiliary opening arm 5. On the other hand, the slots 3b', 3c' and 3d' are respectively formed in these shielding blades 3b, 3c and 3d respectively and a pin 4f which protrudes from the middle part on the reverse side of the opening arm 4 is inserted through these slots respectively. A closing blade group 6 of closing blades which closes the aperture 1a upon completion of exposure comprises 5 blades including a closing slit forming blade 6a and closing blades 6b, 6c, 6d and 6e. The closing slit forming blade 6a is held, virtually in the same manner as the opening blade group 3, by a closing arm 7 and an auxiliary closing arm 8 on their surfaces at shafts 7a and 8a, these arms 7 and 8 being rotatably held at shafts 7e and 8e on the base plate 1 respectively. The closing blades 6b, 6c, 6d and 6e are held to be rotatable coaxially with the shaft 8e. A pin 7f which is provided in the middle part of the closing arm 7 to protrude from the surface thereof is inserted into the slots 6b', 6c', 6d' and 6e' which are provided in these closing blades 6b, 6c, 6d and 6e respectively.

Figure 3:
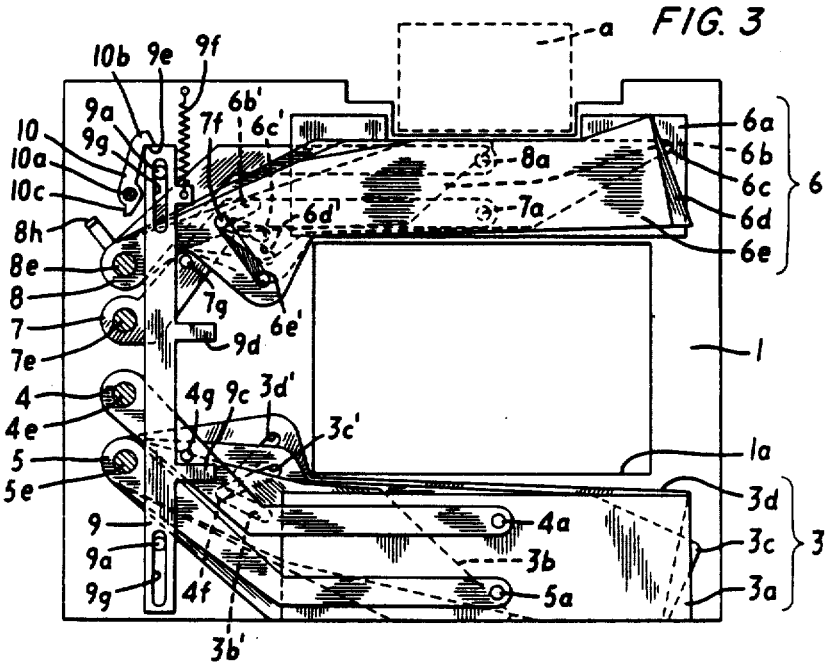

When the aperture 1a has been opened, the opening blade group 3 and the closing blade group 6 are respectively folded or retracted into spaces provided in the lower and upper parts of the camera. Then, the size of the closing blade group 6 in a folded or retracted state in the upper part is arranged to be smaller than that of the opening blade group 3, also in a folded or retracted state in the lower part. A driving member 9 comprises arms 9c and 9d which respectively engage pins 4g and 7g protruding from the middle parts of the opening and closing arms 4 and 7; a side edge portion 9e which is provided for locking; and two slots 9g. The driving member 9 is mounted for sliding movement in the upper and lower directions on two shafts 9a, with two slots 9g serving as guides; while a spring 9f constantly urges the member 9 upward. A hook member 10 comprises a claw 10b which serves to lock the driving member 9, and an arm 10c which engages a curved portion 8h of the auxiliary closing arm 8. A rightward turning spring (not illustrated) is disposed to be rotatable on a shaft 10a to bias the hook member in the rightward or clockwise direction.

The focal plane shutter described in the foregoing operates as follows: With the shutter under the charged condition as illustrated in FIG. 2, when a release button of the camera is depressed to release the shutter by a known method, the opening arm 4 is unlocked (not illustrated) and a spring (not shown) causes the arm 4 to swing clockwise. Then, the link mechanism arranged in the nature of parallelogram causes the opening slit forming blade 3a to run in a parallel manner downward over the aperture 1a. Concurrently with this each of the shielding blades 3b, 3c, and 3d rotates through an angle corresponding to the slot provided therein, on the shaft 5e with the rotation being aided by the pin 4f which is inserted in the slots 3b', 3c' and 3d' of these blades. In this manner, the opening blade group 3 opens the aperture 1a and this results in a condition as illustrated in FIG. 3. After the release of the opening blade group 3, when the time of exposure set by known means has elapsed, the closing arm 7 is released from locking means (not illustrated) and begins to swing clockwise due to the force of an unillustrated spring. Then, the link mechanism arranged in the nature of a parallelogram causes the closing slit forming blade 6a to run downward as viewed in the drawing over the aperture 1a in a parallel manner; while the pin 4f which is inserted through each of the slots 6b', 6c' and 6d' of the shielding blades 6b, 6c and 6d causes these shielding blades to rotate on the shaft 8e through angles corresponding to the slots respectively. The closing blade group thus closes the aperture 1a to complete the exposure and bring about a condition as illustrated in FIG. 4.

Figure 4:
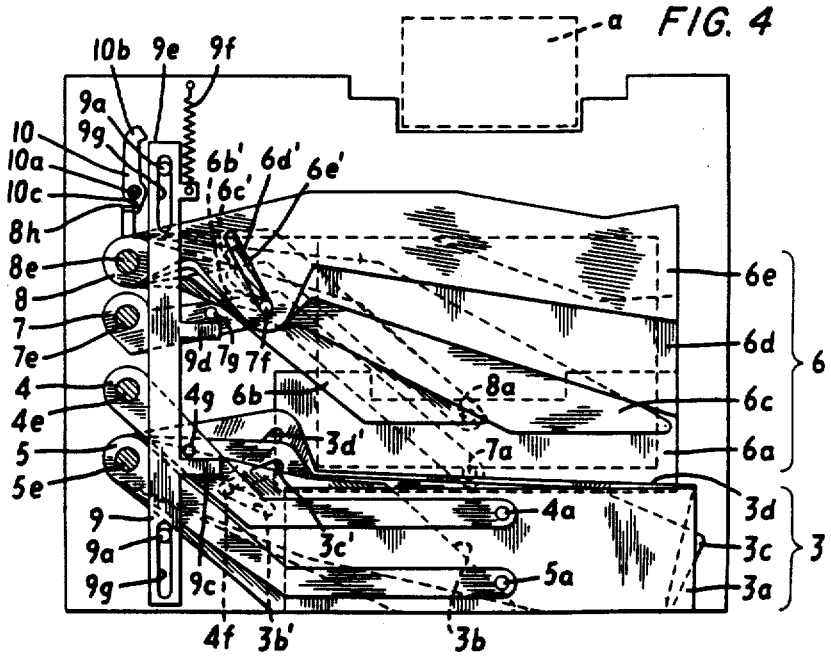

In FIG. 4 which illustrates the condition immediately after completion of exposure, the driving member 9 is unlocked with the hook member 10 having been turned counterclockwise by the curved portion 8h under this condition. Further referring to this drawing, when the driving member 9 which has been unlocked is moved upward by the spring 9f, the arms 9c and 9d which are provided on the driving member 9 engage with and push the pins 4g and 7g which are protruding from the opening and closing arms 4 and 7 to move the groups 3 and 6 of opening and closing blades approximately into their charged positions. This brings about a condition as illustrated in FIG. 5 showing that a series of actions have been completed.

Figure 5:
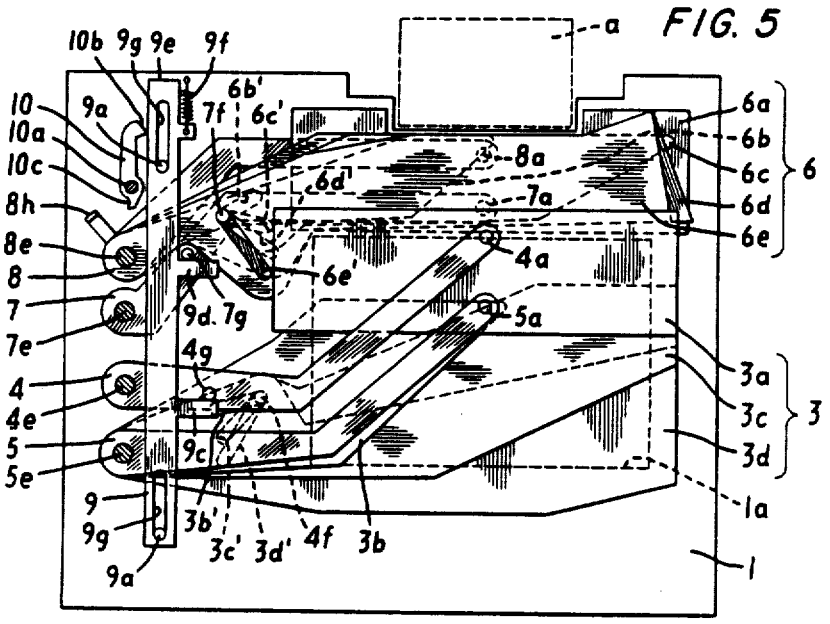

Referring now to FIG. 5, the shutter is charged in the following manner: After the opening and closing arms 4 and 7 have been brought into locked positions by known means (not shown) against the force of an unillustrated spring arrangement, the driving member 9 is pushed downward against the spring 9f by a known method to lock it by means of the hook member 10. This results in the condition as illustrated in FIG. 2.

Figure 6:
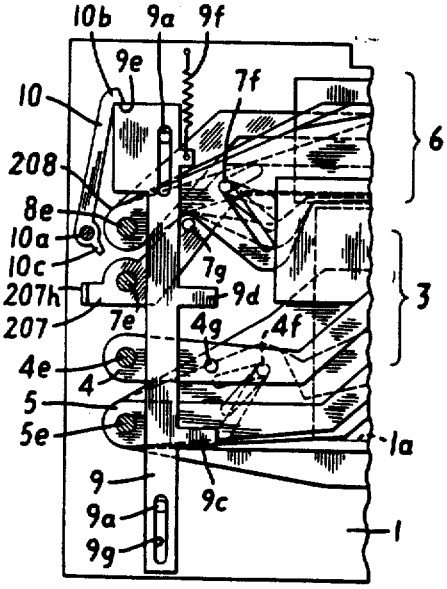
FIG. 6 is a partial plan view of a second embodiment of the invention showing the essential part of the shutter in a state of having been charged.

The second embodiment of this invention is illustrated in FIG. 6, which is a plan view showing the essential parts under a charged condition. Unlike the first embodiment, the opening and closing blade groups 3 and 6, after completion of their exposing actions, are moved in the charging directions in response to engagement with a curved part 207h of a closing arm 207 instead of the curved part 8h of the first embodiment. In FIG. 6, the parts which are virtually the same as the corresponding parts of the first embodiment are indicated by like reference numerals while the parts which are modified from the corresponding parts of the first embodiment are indicated by adding 200 to the reference numerals used in the first embodiment, so that they can be understood without repeated description.

Figure 7:
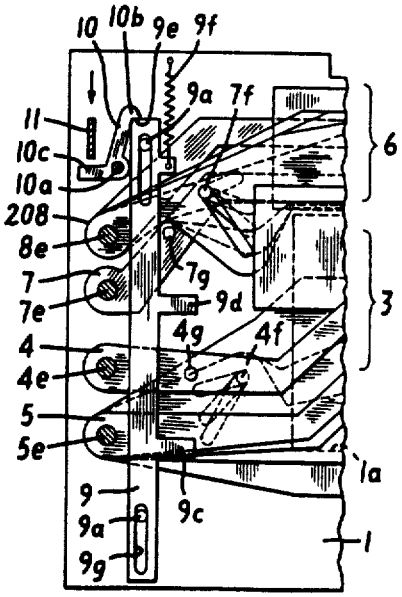
FIG. 7 is another partial plan view illustrating a third embodiment of the invention and showing the essential part of the shutter in a state of having been charged.

FIG. 7 is a plan view of the third embodiment showing the essential parts thereof under a charged condition. Unlike the first embodiment, the opening and closing groups 3 and 6 of blades, which have completed their exposing actions, are arranged to move not in response to the curved part 8h of the first embodiment but in response to engagement with an operating member 11 which operates in the direction of the arrow in relation to the movement of a reflecting mirror back to the image reflecting position thereof.

FIG. 8 is a plan view of the fourth embodiment of this invention showing the shutter under a charged condition. This embodiment differs from the first embodiment as follows: The opening blade group 403 and the closing blade group 406 respectively consist of two opening blades 403a and 403b and two closing blades 406a and 406b which are held at shafts 4a, 5a, 4b, 5b, 7a, 8a, 7b and 8b to form a link mechanism which enables these groups of blades to make parallel movements utilizing the nature of a parallelogram respectively. In opening the aperture 1a, the group 403 of opening blades and the group 406 of closing blades are folded or retracted to be stowed in the lower and upper parts of the camera respectively. The size of the closing blade group 406 when retracted and stowed in the upper part is arranged to be smaller than that of the opening blade group 403 when retracted and stowed in the lower part of the camera in the same manner as in the first embodiment. Thus, under the condition of covering the aperture 1a, the light shielding effect of the closing blade group 406 is inferior to that of the opening blade group 403 also in the same manner as the first embodiment. Furthermore, the parts which are virtually the same as the corresponding parts of the first embodiment are indicated by like reference numerals while the parts which are modified from the corresponding parts of the first embodiment are indicated by adding 400 to the reference numerals used in the illustration of the first embodiment, so that they can be understood without repeating the same description.

Figure 9:
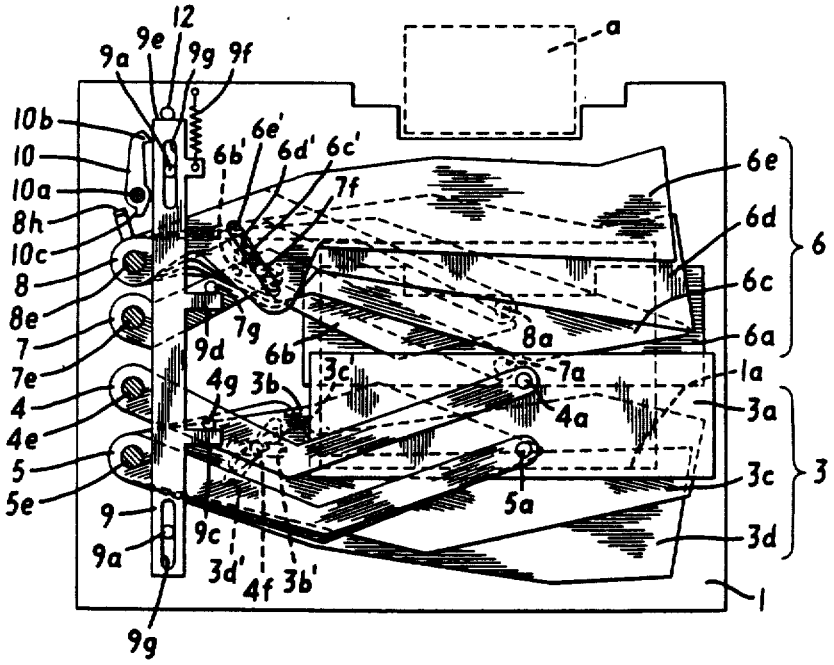
FIG. 9 is another plan view of a fifth embodiment of the invention in a state of having completed a series of actions.

FIG. 9 is a plan view of the fifth embodiment of this invention showing it in a state of having completed of series of actions, this state corresponding to the state shown in FIG. 5 which illustrates the first embodiment. This embodiment differs from the first embodiment as follows: To shorten the operating stroke of the driving member 9 required for displacing the opening and closing groups 3 and 6 of blades in the changing direction, there is added a stop pin 12 which permits moving the closing blade grouup 6 up to a folded or retracted position where a sufficient light shielding effect can be obtained and also permits moving the opening blade group 3 up to a point where this group overlaps the closing blade group 6 thereby giving a sufficient light shielding effect. More specifically stated, when an aperture is covered by a shutter arrangement consisting of a plurality of divided blades, the light shielding effect of the shutter blades increases as they move from their full aperture covering positions toward their folding positions or, in other words, as they overlap each other to a greater degree. This advantage of divided shutter blades is further utilized in the fifth embodiment by minimizing the operating stroke of the driving member 9, so that the size of the shutter can be more advantageously made smaller. In charging the shutter, either the opening and closing arms 4 and 7 or the auxiliary closing arms 5 and 8 are turned counterclockwise against the force of an unillustrated spring to be locked by unillustrated known means; and the driving member 9 is pushed downward against the spring 9f by a known method to lock it with the hook member 10. The shutter operates virtually in the same manner as in the first embodiment.

Figure 10:
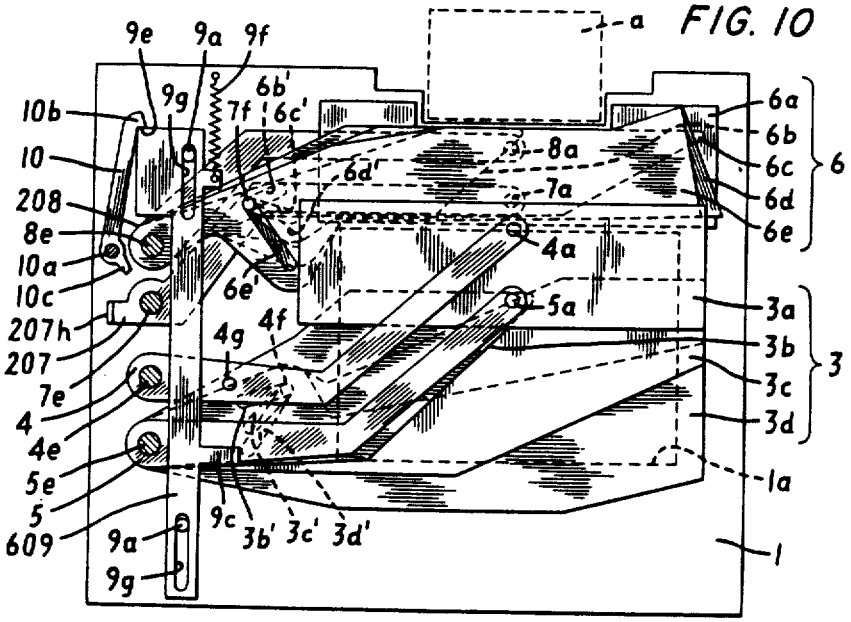
FIGS. 10 and 11 are plan views both illustrating a sixth embodiment of the invention, FIG. 10 showing it in a charged state and FIG. 11 showing it in a state of having completed a series of actions.
Figure 11:
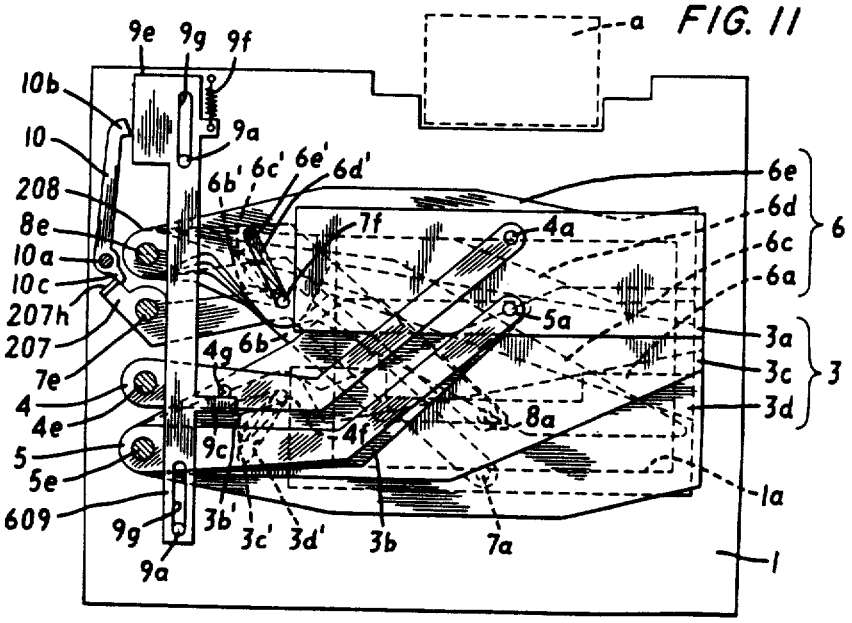

FIGS. 10 and 11 are plan views of the sixth embodiment of this invention. FIG. 10 illustrates the shutter in a state of having been charged while FIG. 11 illustrates it in a state of having completed a series of actions. In these drawings, like reference numerals indicate like parts as compared with the preceding embodiment with the exception that the parts modified in this example are indicated by adding 600 to the applicable reference numerals to make them self-explanatory.

Next, the operation of the shutter is as follows: With the shutter under the charged condition as shown in FIG. 10, the shutter is released by a known method when a release button of the camera is depressed. The opening arm 4 which has been locked by unillustrated means is thereby unlocked and begins to swing clockwise due to the force of an unillustrated spring. The link mechanism which is arranged utilizing the nature of a parallelogram causes the opening slit forming blade 3a to run downward parallel with and over the aperture. Concurrently with this, the pin 4f which protrudes from the opening arm 4 and is inserted in the slots 3b', 3c' and 3d of the shielding blades 3b, 3c and 3d causes these shielding blades to turn on the shaft 5e through angles corresponding to their respective slots. Thus, the aperture 1a is opened by the opening blade group 3. After the release of the opening blade group 3, when the exposure time as set by known means has elapsed and the closing arm 207 is released from unillustrated locking means, the closing arm is caused to begin a clockwise turn. Then, the link which is arranged utilizing the nature of a parallelogram causes the closing slit forming blade 6a to run downward over the aperture 1a in parallel therewith. Concurrently with this, the pin 7f which protrudes from the closing arm 207 and is inserted in the slots 6b', 6c', 6d' and 6e' of the shielding blades 6b, 6c, 6d and 6e causes these shielding blades to turn on the shaft 8e through angles corresponding to their respective slots. The closing blade group 6 thus closes the aperture 1a to complete the exposure.

In the region where the closing blade group 6 completes the exposure action, the curved part 207h of the closing arm 207 causes the hook member 10 to turn counterclockwise and the driving member 609 is unlocked accordingly. The force of the spring 9f then causes the unlocked driving member 609 to move upward. This in turn causes the arm 9c provided on the driving member 609 to push the pin 4f protruding from the opening arm 4; and the opening blade group 3 is displaced thereby approximately into a charged position to complete a series of actions and this results in the condition as illustrated in FIG. 11.

In charging the shutter, either the opening and closing arms 4 and 207 or the auxiliary opening and closing arms 5 and 208 are caused to turn counterclockwise from the condition illustrated in FIG. 11 against the force of an unillustrated spring and are locked by unillustrated means. At the same time, the driving member 609 is pushed downward by a known method and is locked by the hook member 10 as shown in FIG. 10.

FIG. 12 is a plan view of the seventh embodiment of this invention illustrating it in a state of having completed a series of actions (a condition corresponding to that of the sixth embodiment as illustrated in FIG. 11). To shorten the operating stroke of the driving member 609 required for displacing the opening blade group 3 in the charging direction after completion of an exposure, there is added a stop pin 12. In other words, in cases where an aperture which has already been covered by a group of closing blades is to be additionally covered by a group of opening blades, the purpose can be attained by moving the group of opening blades to cover just a range where the light shielding effect of the group of closing blades is insufficient. Accordingly, in this example, the operating stroke of the driving member 609 is limited to such a range to permit further reduction in the size of the shutter. The shutter in this embodiment operates virtually in the same manner as in the sixth embodiment.

The foregoing description of the embodiment of this invention has been made on the assumption that the shutter is employed in a single-lens reflex camera. However, this invention is not so limited and it is to be understood that the invention may be practiced in exactly the same manner in other types of cameras such as a camera equipped with a range finder. Furthermore, while the driving member 9 or 609 is employed in the foregoing description of the preferred embodiments for displacing the opening and closing blade groups in the charging direction after completion of an exposure, other types of members such as a member which operates in relation to the movement of a reflecting mirror back to an image reflecting position may be employed in place of the driving member; or some essential component of the camera, such as a reflecting mirror, may be arranged to directly or indirectly move the opening blade group up to a preset position. As for the signal required for displacing the opening and closing blade groups in the charging direction after completion of an exposure, many modifications are possible other than those arrangements employed in the foregoing embodiments. Such modifications include, for example, an arrangement to give the signal by the return stroke of the release; the use of a delaying device for giving the signal at a preset period of time after the displacement of the opening blade group has commenced; etc.

With the divided shutter blades arranged as described in the preferred embodiments of this invention, the inconstancy of exposure that otherwise tends to be caused by the frictional resistance between the closing blades, the effect of the inertial mass, etc. is eliminated to enhance the precision of exposure.

When this invention is applied to focal plane shutters of the type composed of cloth screens, titanium screens, or the like, the restrictions imposed on the material, thickness and/or shape to ensure the light shielding effect can be eased to give advantages in terms improvement in performance or reduction in cost.

What is claimed is:

1. A camera shutter mechanism *for a camera having a view finder* for opening and closing a shutter aperture to effect an exposure comprising: *a base plate having therein a shutter aperture, the base plate having a vertical height dimension and a horizontal width dimension and having a widthwise extending recess at the upper part thereof at a location vertically above the shutter aperture, the recess being dimensioned to accommodate therein the lower part of the view finder;* a group of opening blades movable, when released, from a closed *charged* position in which they cover the shutter aperture to an open position in which they do not cover the shutter aperture to initiate an exposure, *said group of opening blades being arranged to be stowed in a space provided in the lower part of the camera;* a group of closing blades movable, when released, from an open *charged* position in which they do not cover the shutter aperture to a closed position in [with] *which* they cover the shutter aperture to terminate the exposure, *said group of closing blades being arranged to be stowed in a space provided in the upper part of the camera beneath the view finder such that the stowed closing blades do not obstruct the optical path of the view finder; said group of opening blades having better light-shielding effectiveness than said group of closing blades when in the closed position;* release means for releasing the opening blades thereby enabling them to move to the open position for initiating the exposure, and for subsequently releasing the closing blades thereby enabling them to move to the closed position for terminating the exposure; and means including a driving member automatically operable immediately after completion of the exposure for moving the group of opening blades back towards the closed position so that the aperture is at least partially covered thereby *so that after termination of the exposure, though before charging of the shutter, the aperture is at least partially covered by the opening blade group which has better light-shielding effectiveness than the closing blade group.*

2. A camera shutter mechanism as defined in claim 1; wherein said last-mentioned means comprises means for effecting at least partial covering of the shutter aperture by said group of opening blades within a predetermined period of time after completion of the exposure.

3. A camera shutter mechanism as defined in claim 1; wherein said last-mentioned means comprises means for displacing at least one of said groups of opening and closing blades in the shutter charging direction to an extent such that the opening and closing blades sufficiently overlap one another to attain a good light-shielding effect within a predetermined period of time after completion of the exposure.

4. A camera shutter mechanism as defined in claim 3; wherein said last-mentioned means comprises means for applying sufficient driving force to said driving member to displace said group of closing blades and/or said group of opening blades in the shutter charging direction within a predetermined period of time after completion of the exposure.

5. A camera shutter mechanism as defined in claim 4; including a hook member operable to hold said driving member under a charged condition.

6. A camera shutter mechanism as defined in claim 5; further including a closing arm having a curved portion engageable with said driving member to effect actuation thereof.

7. A camera shutter mechanism as defined in claim 1; wherein said group of closing blades is composed of divided blades which can be stowed in a space smaller than the space required for stowing said group of opening blades.

8. A camera shutter mechanism as defined in claim 7; wherein said group of closing blades is composed of a greater number of divided blades than the number of divided blades of said group of opening blades.

* * * * *